United States Patent [19]

Trzyna

[11] 3,735,039

[45] May 22, 1973

[54] EXCESSIVE BEAM CURRENT INDICATOR CIRCUIT

[75] Inventor: William A. Trzyna, Chicago, Ill.

[73] Assignee: Zenith Radio Corporation, Chicago, Ill.

[22] Filed: Dec. 6, 1971

[21] Appl. No.: 204,815

[52] U.S. Cl. .........178/7.5 R, 178/7.3 R, 178/DIG. 4

[51] Int. Cl. ..............................................H04n 5/00

[58] Field of Search .......................178/5.4 R, 7.3 R, 178/7.5 R, DIG. 4; 324/122, 133

[56] References Cited

UNITED STATES PATENTS 3,546,536 12/1970 Umin................................178/7.3 R 3,637,923 1/1972 Poppy...............................178/5.4 R 3,304,498 2/1967 Myers.................................324/133

*Primary Examiner*—Richard Murray

*Attorney*—Nicholas A. Camasto et al.

[57] ABSTRACT

An excessive beam current indicator circuit in a television receiver for indicating whenever the beam current in a cathode-ray tube exceeds a predetermined, maximum "safe" level. The indicator circuitry utilizes the anode current supplied to the second anode of a cathode-ray tube to develop a voltage drop across a resistor interposed in the anode lead. The voltage drop, representative of the actual beam current, is applied to a switch device, such as a neon bulb, causing it to ignite whenever its firing potential is exceeded. Proper selection of the resistor insures that the neon device will light only when the beam current exceeds the maximum "safe" level.

5 Claims, 2 Drawing Figures

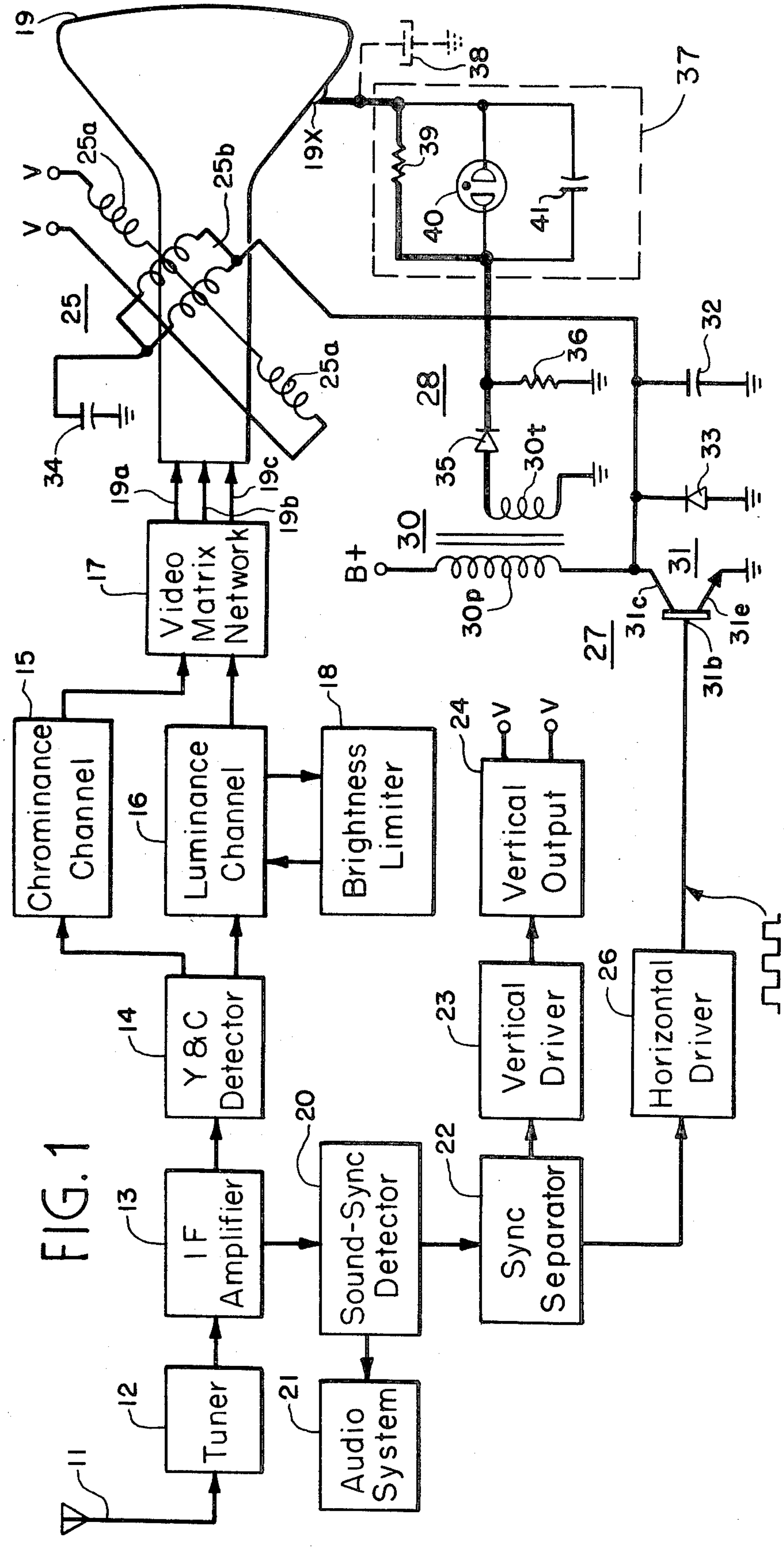
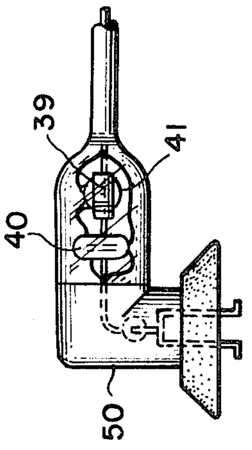
FIG. 2

EXCESSIVE BEAM CURRENT INDICATOR CIRCUIT

BACKGROUND OF THE INVENTION

The present invention relates generally to improvements in television receivers and more particularly to an excessive beam current indicator circuit for indicating whenever the anode current supplied to the cathode-ray tube exceeds a predetermined, maximum "safe" level.

In both color and monochrome television receivers, the level of beam current generated within the image reproducer is dependent upon the contrast and brightness adjustments of the receiver circuitry and the amplitude of the alternating current (AC) components, i.e., luminance information, as applied to the reproducer. Accordingly, if the average beam current remains at levels higher than the intended design limits over an extended period of time, the power dissipation capabilities of the cathode-ray tube may be exceeded. In addition, the high-voltage power supply may be incapable of delivering the required beam current. Such overloading reduces the power supply output voltage and results in undesirable raster "blooming." That is, there will be a loss of brightness, reduction of horizontal width, and severe defocusing of the reproduced image. Various arrangements are known in the art to compensate or prevent such operational deficiencies from occurring. For example, a frequent practice is to provide a brightness limiter to insure that the beam current does not exceed a set maximum, and thus, "safe" level. Primarily due to component tolerances, however, the level of luminance information required to generate identical beam currents varies between receivers. Consequently, some provision of adjustment is necessary for such brightness limiters to safeguard the high-voltage power supply and the cathode-ray tube against destructive overload. Adjustment of the associated brightness limiter when employed has heretofore been a complicated, time consuming procedure which, inter alia, required the insertion of a high-voltage meter in series with the anode lead of the television receiver. Considering the large number of television receivers produced each year, this procedure obviously increases the total cost of mass-producing such receivers. Furthermore, due to interaction between the brightness limiter and various other service adjustment controls, such as the AGC, the accuracy of the brightness limiter adjustment is destroyed as soon as any of the other service adjustment controls are changed. If the brightness limiter is not then readjusted, any benefits derived from including the brightness limiter in the television receiver are lost.

SUMMARY OF THE INVENTION

Accordingly, it is an object of the present invention to provide a new and improved circuit arrangement for indicating excessive beam current in a television receiver which overcomes the aforenoted disadvantages and deficiencies of prior circuits.

A more particular object of the present invention is to provide an excessive beam current indicator circuit of the foregoing type which materially aids in properly adjusting a brightness limiter circuit so that the beam current does not exceed a predetermined maximum, ergo, "safe" limit.

Another object of the present invention is to provide an excessive beam current indicator circuit of the foregoing type which provides a quick, inexpensive method of adjusting the brightness limiter.

A further object of the present invention is to provide an excessive beam current indicator circuit of the foregoing type which may be incorporated into the anode lead "cap" of a cathode-ray tube.

In accordance with the present invention, an excessive beam current indicator circuit is provided for indicating whenever the beam current generated within the cathode-ray tube exceeds a predetermined, maximum "safe" level. The indicator circuit of the present invention contemplates the utilization of a series limiting resistance interposed in the anode lead between the high-voltage power supply and the second anode of the cathode-ray tube and serves to develop a control voltage thereacross representative of the instantaneous beam current. A neon bulb is connected in parallel with the resistance so as to be actuated whenever the developed control voltage exceeds the firing potential of the neon device and thereby indicate that the maximum "safe" beam current limit has been exceeded.

BRIEF DESCRIPTION OF THE DRAWING

The features of this invention which are believed to be novel are set forth with particularity in the appended claims. The invention together with its further objects and advantages thereof, may be best understood, however, by reference to the following description taken in conjunction with the accompanying drawings, in which like reference numerals refer to like elements in the several figures and in which:

FIG. 1 is a schematic and block diagram of a television receiver which includes an excessive beam current indicator circuit in accordance with the invention; and FIG. 2 is a view of a novel anode lead cap for a cathode-ray tube in accordance with one embodiment of the invention.

PREFERRED EMBODIMENT OF THE INVENTION

Referring now to FIG. 1, a color television receiver is shown which embodies an excessive beam current indicator circuit in accordance with the present invention. The receiver includes an antenna 11 coupled to an input tuner stage 12 which amplifies the received signals and converts the same to intermediate-frequency signals in the well-known manner. The amplified and converted signals are coupled to intermediate-frequency (IF) amplifier 13 where they are further amplified and then coupled to luminance (Y) and chrominance (C) detector 14, and also to a sound & sync detector 20. The Y & C detector 14 is connected to a chrominance channel 15 for developing chrominance signals, which are applied to the video matrix network 17 as one of the informational inputs thereto. Detector 14 is likewise connected to the luminance channel 16 wherein the luminance signals are processed prior to application to the video matrix network 17, forming the other of its informational inputs. A brightness limiter 18 coupled to and working in conjunction with luminance channel 16 is effective to maintain the level of luminance information within a predetermined range. Appropriate matrixing occurs within matrix network 17 such that signals containing the correct brightness, hue and color saturation information are derived and applied to the appropriate control electrodes of the image reproducer 19 in a manner understood in the art. The image reproducer 19 may be a conventional shadow mask cathode-ray tube comprising a tri-color image screen or target (not shown) to be selectively scanned by a group of three electron beams developed by individual guns within the tube. In the embodiment of the receiver as herein shown the color signals R, G and B are applied directly to the cathodes 19*a*, 19*b* and 19*c*, respectively. It should be understood, however, that other systems are equally compatible, such as those receivers designed to utilize color difference signals. The type of chroma processing is not directly related to the subject matter of the present invention and is in no way critical to this operation.

As indicated, sound & sync detector 20 connects to an audio system 21 having appropriate circuitry for reproducing the audio portion of the received signals. Sound & sync detector 20 further connects to a sync separator 22 wherein the sync portions of the received signals are stripped from the composite video signal. The vertical synchronization pulses developed by the sync separator 22, in turn, are coupled to vertical driver 23 and appropriate signals are developed for application to the vertical out-put stage 24. Output scanning signals are then applied through a circuit formed by connecting points V together to the vertical winding 25*a* of deflection yoke 25 positioned about the image reproducer 19. Sync separator 22 also develops horizontal synchronization pulses which are coupled to horizontal driver 26. The horizontal output stage, identified generally at 27, utilizes input signals derived from horizontal driver 26 to develop appropriate scanning signals for application to the horizontal windings 25*b* of deflection yoke 25. Horizontal output stage 27 further combines with a high-voltage system 28 to develop a high-voltage accelerating potential for application to the second anode 19*x* of the image reproducer 19.

As thus far described, the receiver is conventional in general construction and operation such that further and more particular operational descriptions should not be necessary. More particular consideration, however, may now be given to that portion of the receiver which relates to the preferred embodiment of the present invention, and in general constitutes an excessive beam current indicator circuit in conjunction with the horizontal output stage, and the high voltage system, identified generally at 27 and 28, respectively.

In the preferred embodiment disclosed in FIG. 1, a source of d-c potential (B+) is coupled through the primary winding 30*p* of horizontal output transformer 30 to the collector electrode 31*c* of horizontal output transistor 31 for providing an operating potential thereto. The emitter electrode 31*e* is coupled directly to ground. When horizontal drive pulses, such as those shown in FIG. 1 are coupled from the horizontal driver 26 to its base electrode 31*b*, the horizontal output transistor 31 is switched "ON" to deflect the electron beam from the center to the right edge of the cathode-ray tube 19. Upon reaching the right edge of the screen, the transistor 31 is switched "OFF" by the negative portion of the drive pulses applied to its base electrode 31*b*. This generates a rapid change in flux within the core (not shown) of the horizontal output transformer 30 which, in turn, induces a high reactive voltage, or flyback pulse in the associated windings thereof. The flyback pulse developed across the primary winding 30*p* is applied to the horizontal deflection windings 25*b* for reversing the current therethrough in order to move the electron beam from the right side of the screen to the left side.

Immediately following the flyback or retrace interval, transistor 31 remains non-conductive, but the energy stored in the horizontal deflection windings 25*b* and capacitor 32 during retrace is then discharged through the horizontal deflection windings 25*b* and the damper diode 33 to produce an increasing linear current change through the horizontal deflection windings 25*b*. Accordingly, the electron beam is deflected from the left side of the screen to the center. The cycle is repeated as described above when transistor 31 is switched "ON" by the next horizontal drive pulse. Capacitor 34, which couples the horizontal deflection windings 25*b* to ground, in addition to blocking d-c current therethrough, provides "S"-shaping to the current waveform.

The flyback pulses produced across the primary winding 30*p* are "stepped-up" by a tertiary winding 30*t* and subsequently rectified by diode 35 to produce a high-voltage potential at the cathode thereof. A bleeder resistor 36 is also included from the cathode of diode 35 to ground. The high-voltage potential is, in turn, coupled by a network 37 to the second anode 19*x* of the cathode-ray tube 19 where the inherent cathode-ray tube capacitance 38 is charged by the peak forward current pulse flowing during the horizontal flyback interval. During the horizontal scan interval, the discharge current, i.e., beam current, responsive to the reproduced image is discharged from the inherent capacitance 38 through the cathode-ray tube 19. Accordingly, as the average-brightness of the reproduced image over one field increases, the requisite beam current increases proportionately, demanding that the receiver's high-voltage system 28 deliver an increasing amount of energy, i.e., anode current, to recharge the inherent capacitance 38. The brightness limiter 18, however, may be adjusted to limit the luminance information to levels below a maximum "safe" limit thereby preventing the resultant beam current from exceeding intended design levels.

In accordance with one aspect of the present invention, the television receiver includes a novel, excessive beam current indicator circuit to signal the generation of excess beam current and thus aid in proper adjustment of the brightness limiter 18. To this end, a parallel network 37, comprising resistor 39, neon bulb 40 and capacitor 41, is interposed in the anode lead coupling the high-voltage system 28 to the second anode 19*x*. Operationally, when the anode current, i.e., beam current, is within "safe" limits, the neon bulb 40 is non-conductive and the anode current must pass through resistor 39. The neon bulb 40 will not ignite until the voltage drop across its terminals exceeds a predetermined, firing potential. Proper selection of resistor 39 will insure that the firing potential of neon bulb 40 coincides with the voltage drop developed across resistor 39 when the anode current exceeds the set "safe" limit. When this occurs, the resultant voltage developed across resistor 39 will exceed the potential lighting neon bulb 40. Once lighted, neon bulb 40 will conduct a portion of the anode current thereby reducing the voltage drop across resistor 39. Neon bulk 40 will remain lighted, however, as long as the voltage drop across resistor 39 exceeds a level called the extinguishing potential below which the neon is extinguished. Capacitor 41 serves to bypass any 15.75 kHz interference around the neon bulb 40 to prevent AC firing thereof. Accordingly, the brightness limiter 18 may be properly adjusted by setting the limiter 18 to a point where neon bulb 40 first lights and then backing off until neon bulb 40 is extinguished. This eliminates the necessity of inserting a high-voltage current meter in series with the anode lead during factory set-up and subsequent servicing.

FIG. 2 illustrates a novel anode "cap" incorporating the novel excessive beam current indicator circuit. In this embodiment, the network 37 comprised of the parallel connected resistor 39, neon bulb 40 and capacitor 41 is encapsulated in an enlarged anode "cap" 50 molded from a translucent, plastic material. Consequently, the brightness limiter 18 can be adjusted in the aforementioned manner simply by observing the button 50.

While a particular embodiment of the present invention has been shown and described, it will be obvious to those skilled in the art that various changes and modifications may be made without departing from the invention in its broader aspects. Accordingly, the aim in the appended claims is to cover all such changes and modifications as may fall within the true spirit and scope of the invention.

I claim:

1. A circuit arrangement for indicating the presence of excessive beam current within the cathode-ray tube of a television receiver, including in combination:

high-voltage supply means coupled to the cathode-ray tube for applying an energizing current thereto;

circuit means interposed in the current path between said high-voltage supply means and said cathode-ray tube for developing a control voltage representative of the beam current level within the cathode-ray tube;

means coupled to said circuit means for effecting a visual indication responsive to said control voltage exceeding a predetermined, selectable level.

2. A circuit arrangement in accordance with claim 1 wherein said circuit means includes a resistor serially connected between said high-voltage supply means and said cathode-ray tube for developing a voltage drop thereacross directly proportional to the magnitude of said energizing current conducted through said resistor.

3. A circuit arrangement in accordance with claim 2 wherein said means includes a neon bulb connected in parallel with said resistor, said neon bulb igniting to provide said visual indication whenever said voltage drop across said resistor exceeds its firing potential.

4. A circuit arrangement in accordance with claim 3 wherein a capacitor is connected in parallel with said resistor to prevent a-c firing of said neon bulb in response to 15.75 kHz interference signal information.

5. A circuit arrangement in accordance with claim 4 wherein said cathode-ray tube includes an anode connector and wherein said circuit means includes a translucent cap engaging said anode connector; said neon bulb, said resistor and said capacitor all being housed within said translucent cap.

* * * * *